G. R. CORNWALL.
TYPOGRAPHIC MACHINE.
APPLICATION FILED SEPT. 19, 1906.
1,126,618.
Patented Jan. 26, 1915.
12 SHEETS—SHEET 1.
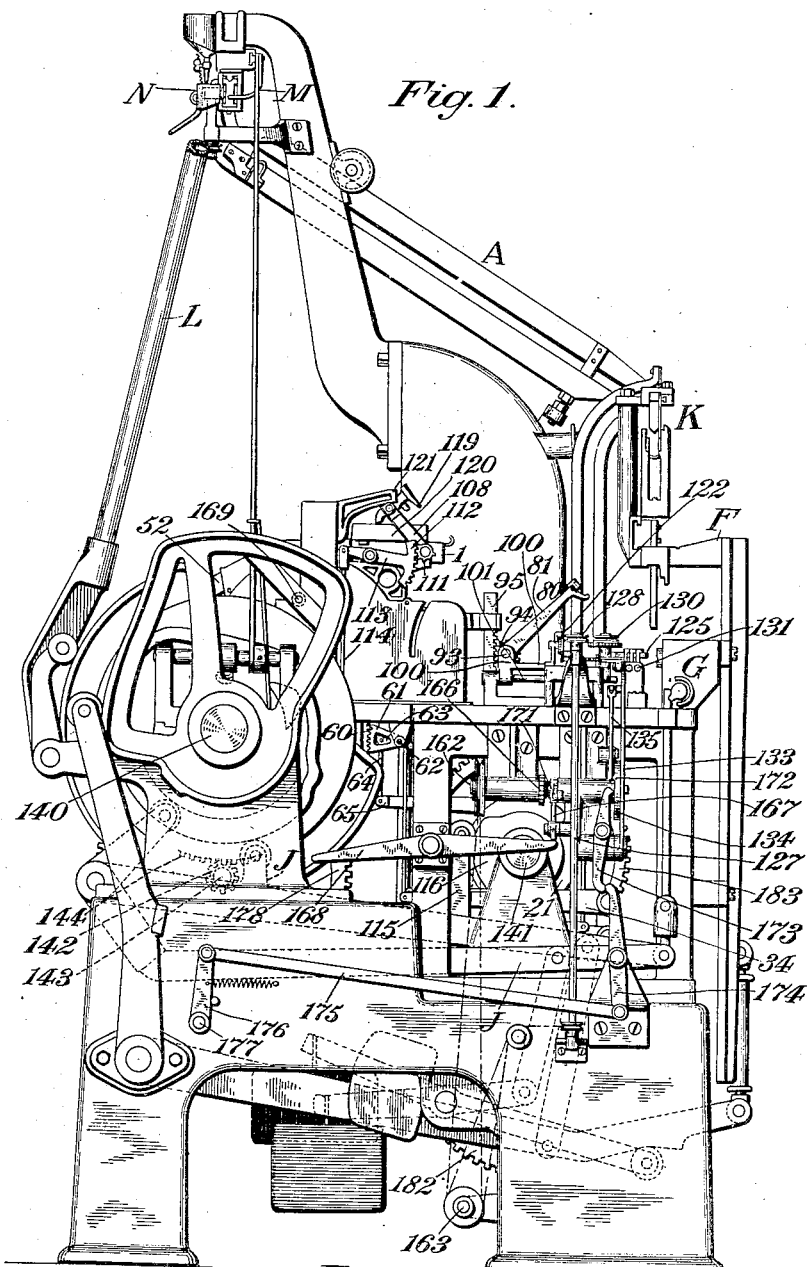
Fig. 1.
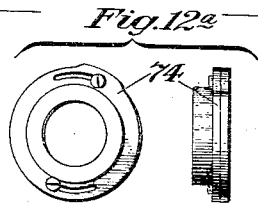
Fig. 12ª
Witnesses:
J. L. Edwards.
A. L. Latzman.
Inventor,
G. R. Cornwall
By J. D. Morgan
Attorney.

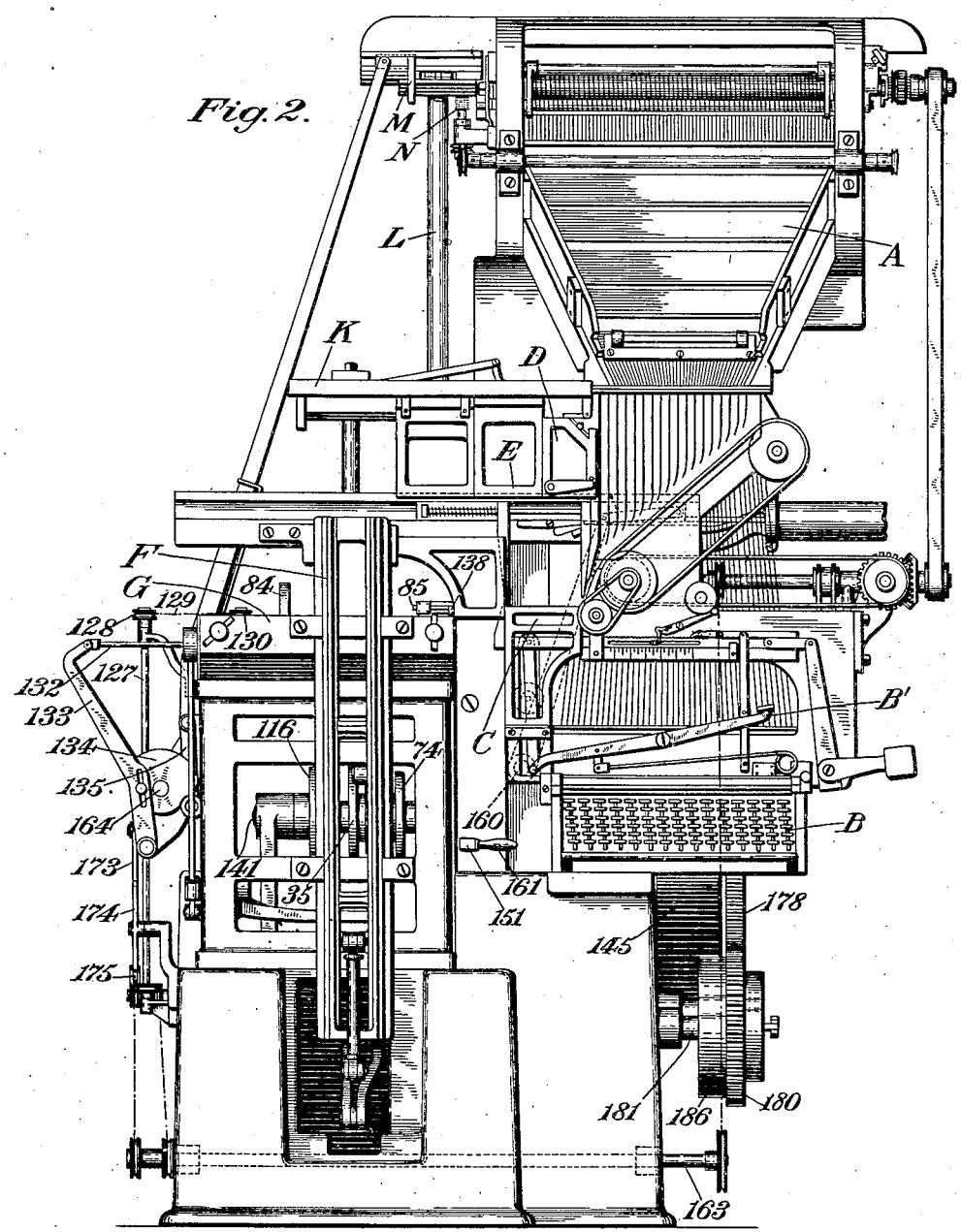

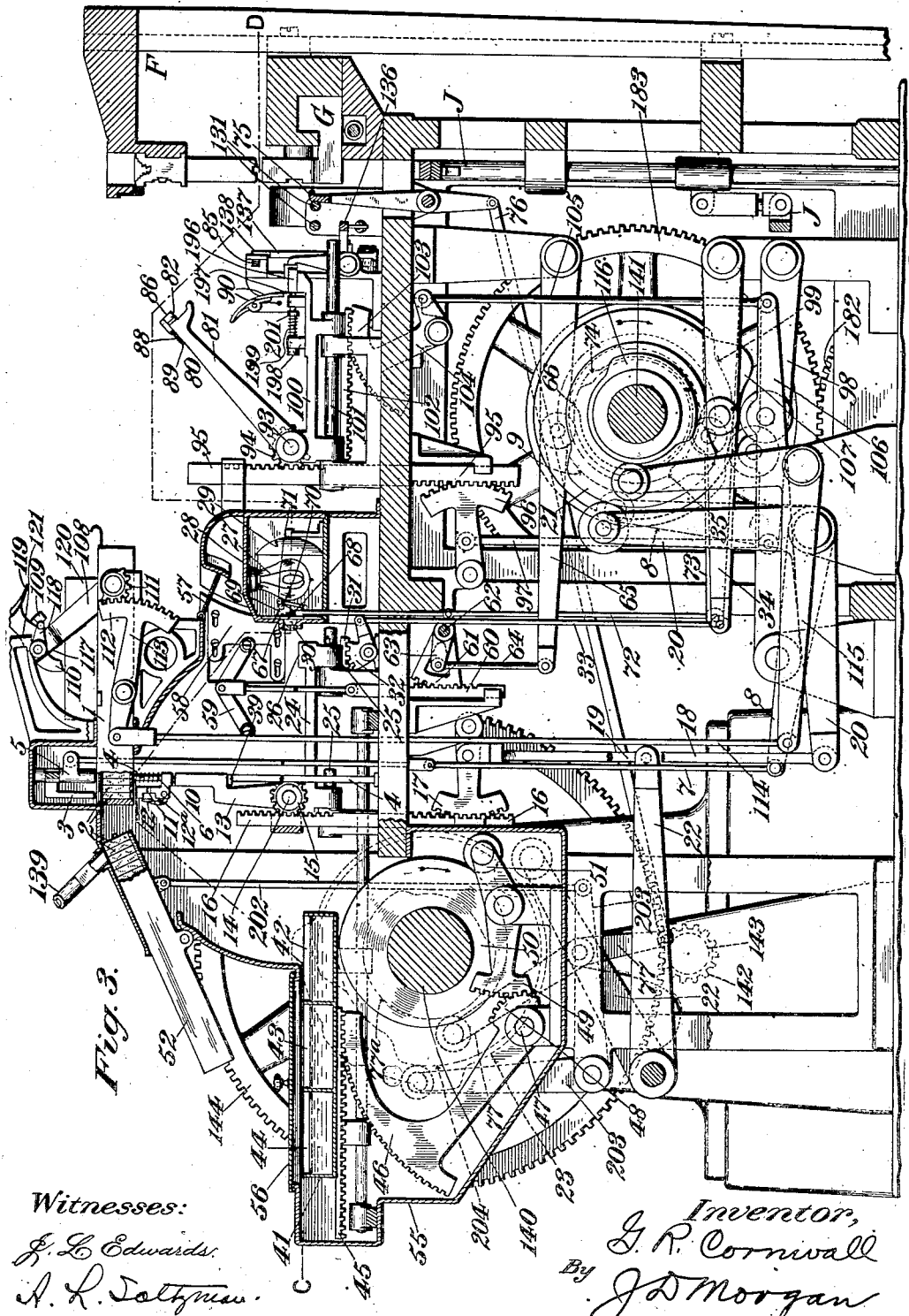

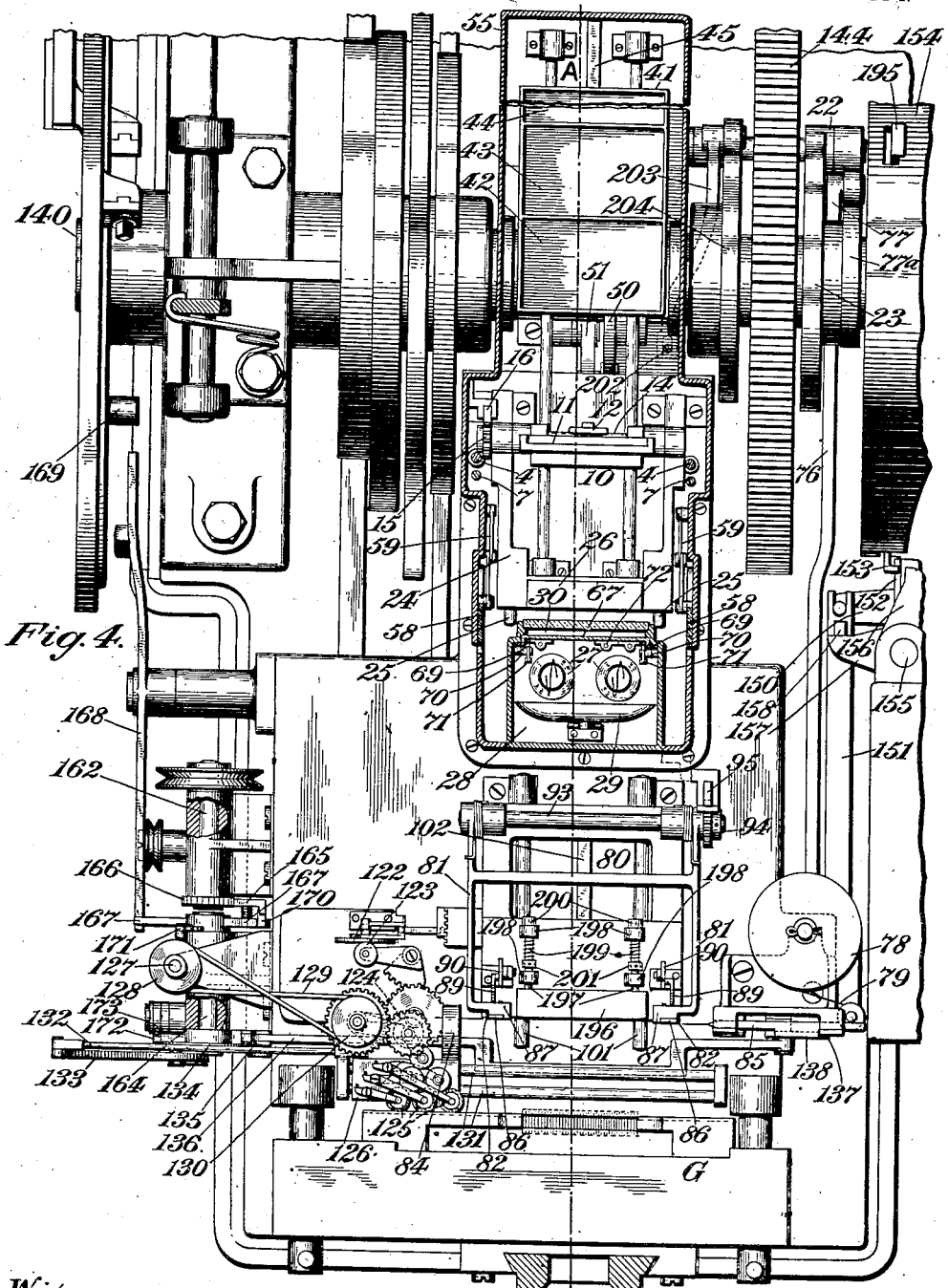

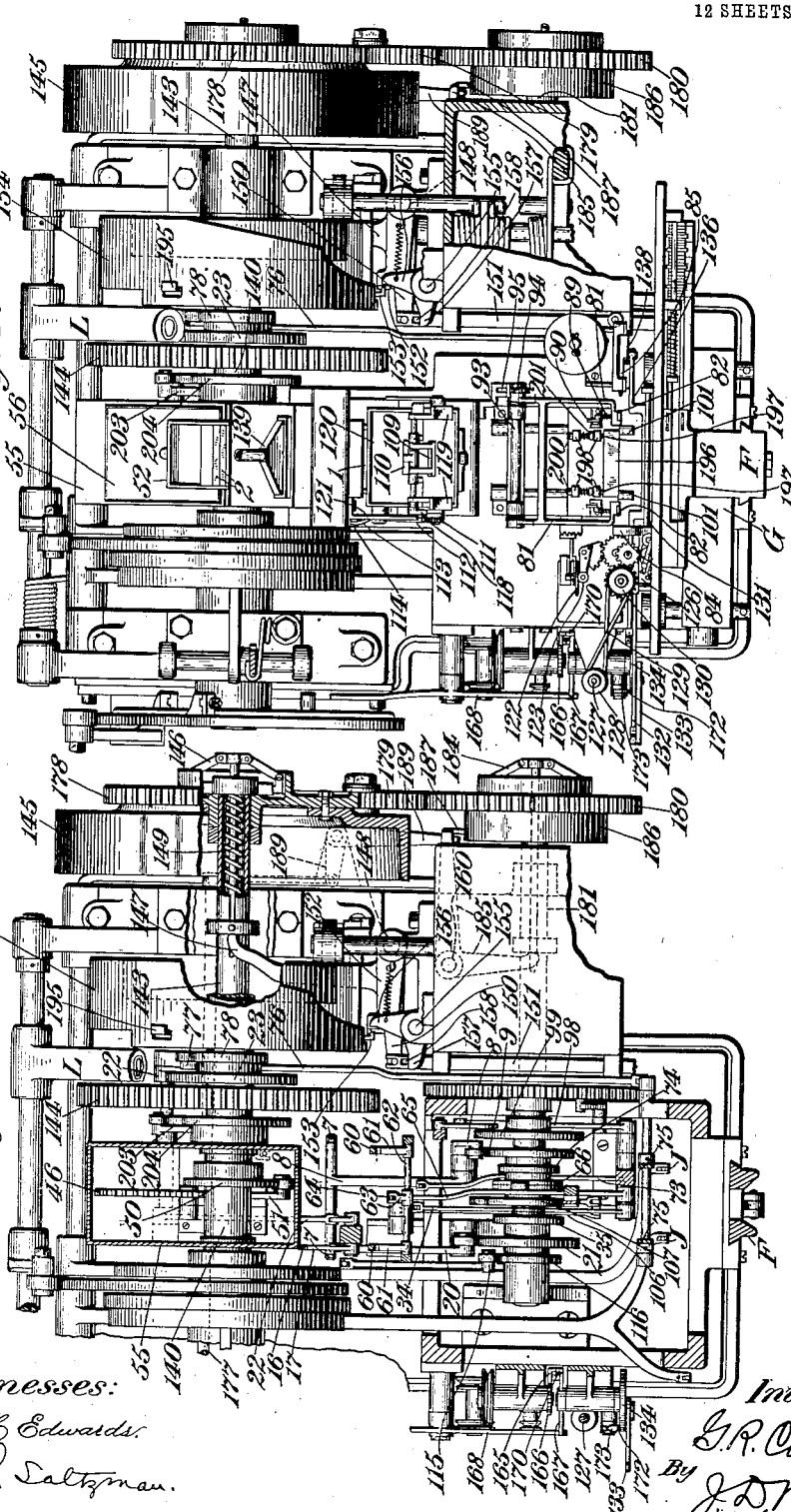

G. R. CORNWALL.
TYPOGRAPHIC MACHINE.
APPLICATION FILED SEPT. 19, 1906.

1,126,618.

Patented Jan. 26, 1915.
12 SHEETS—SHEET 6.

Witnesses:
J. L. Edwards
A. L. Sottyman

Inventor,
By G. R. Cornwall
J. D. Morgan
Attorney.

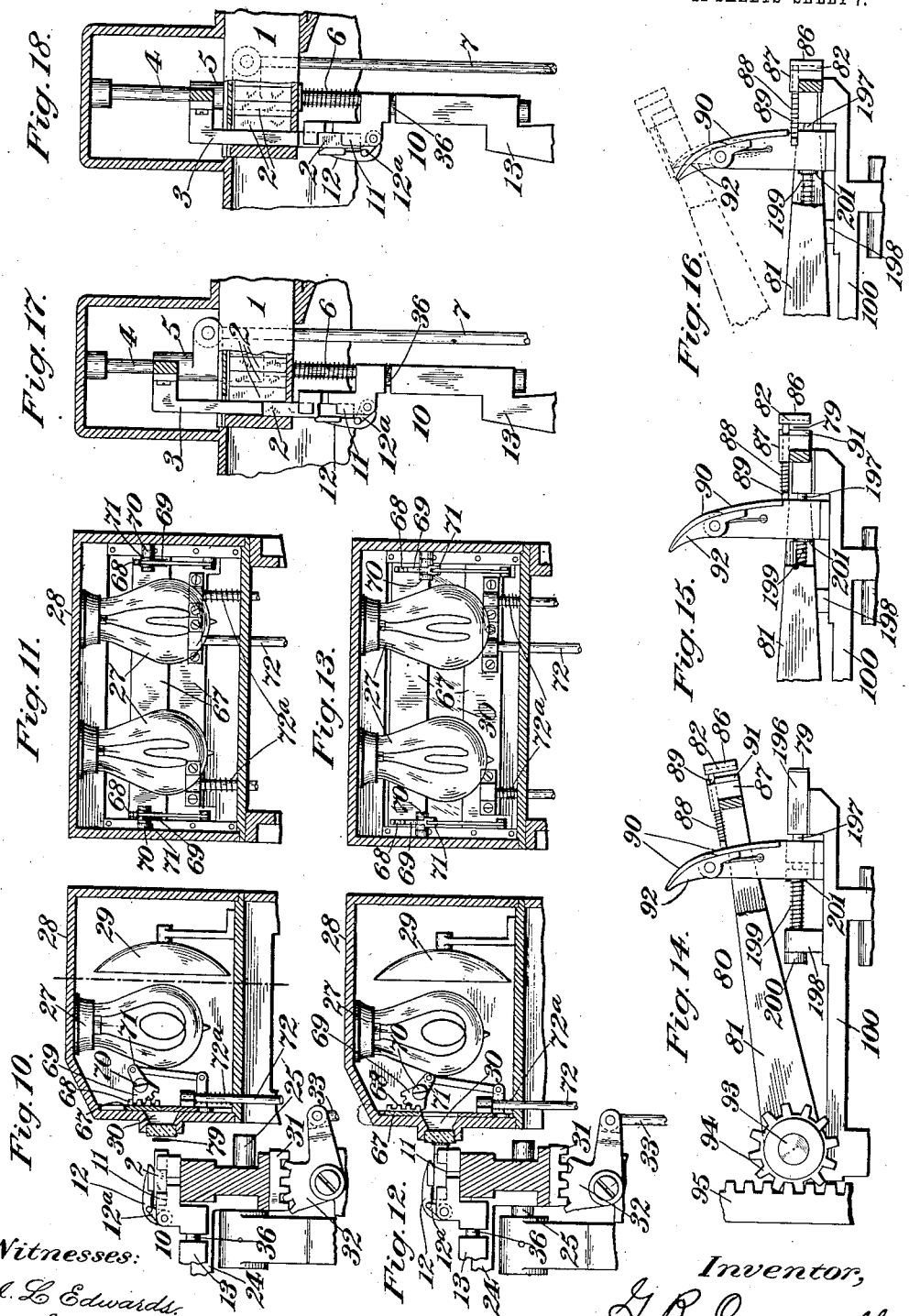

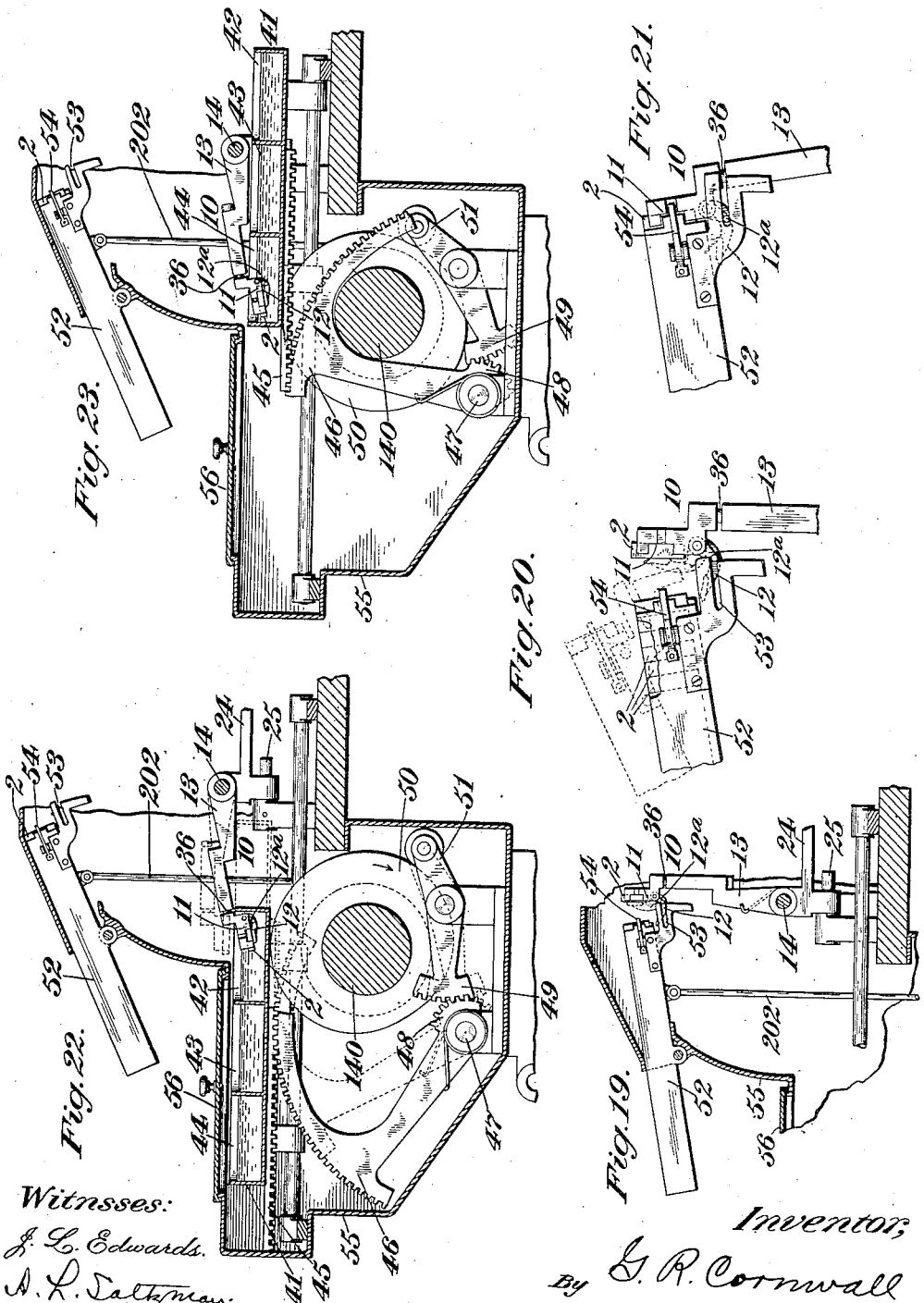

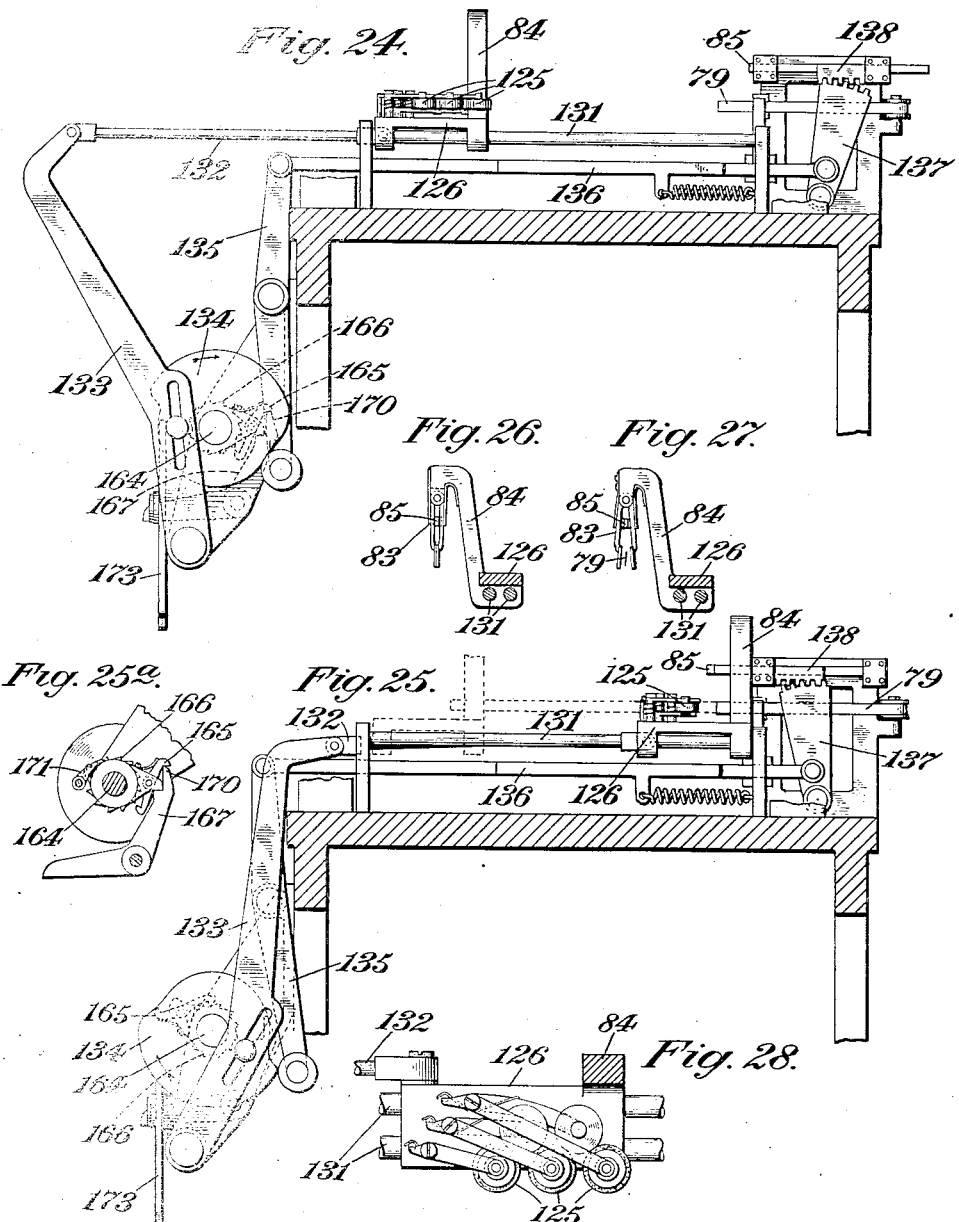

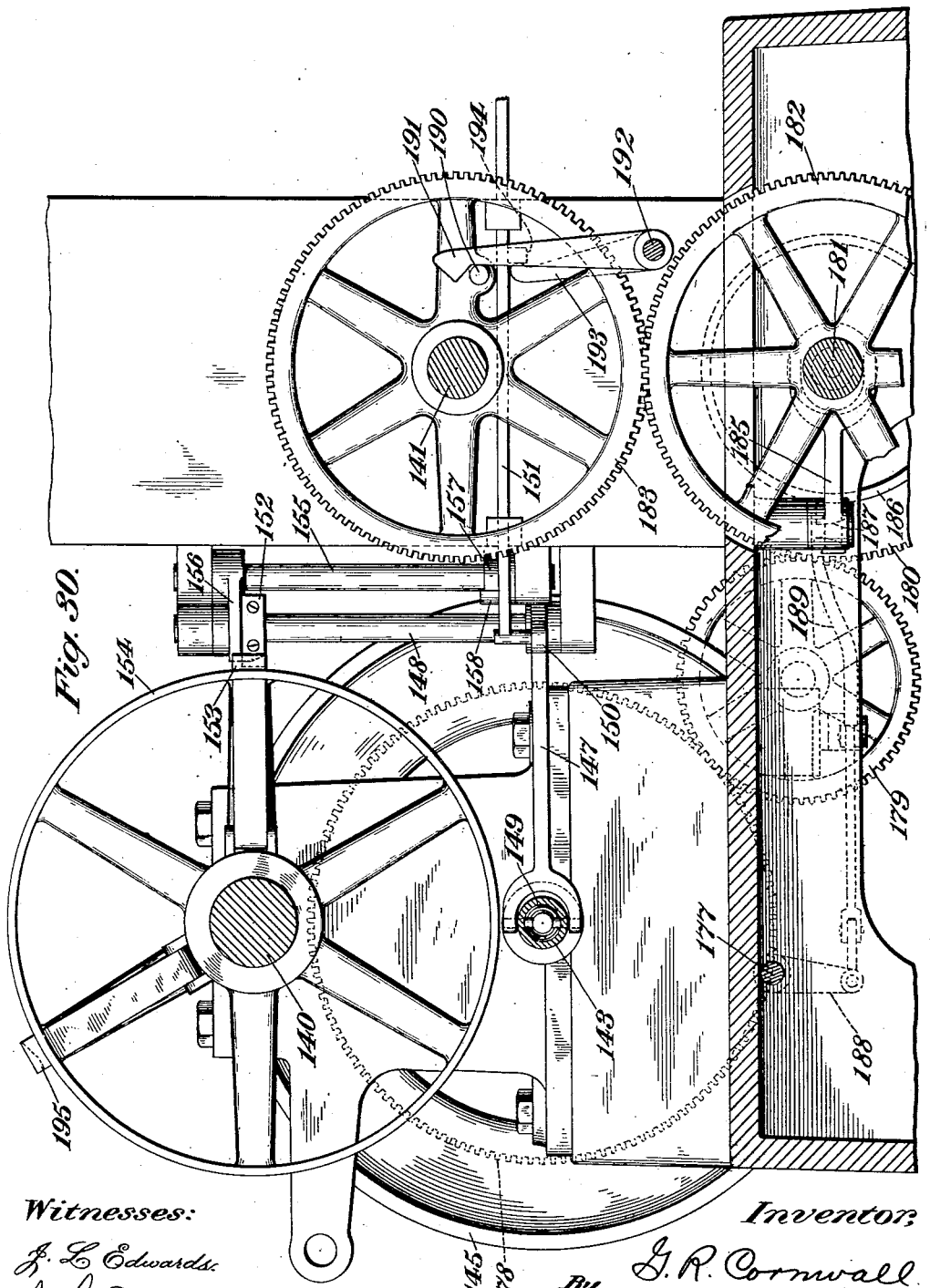

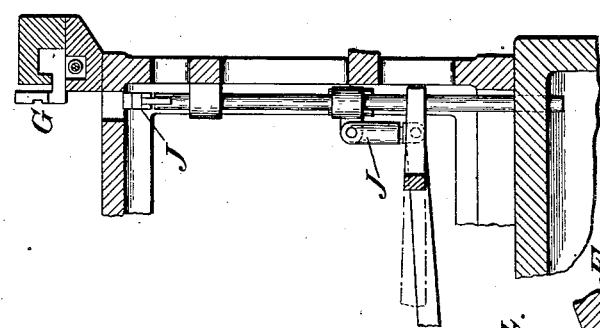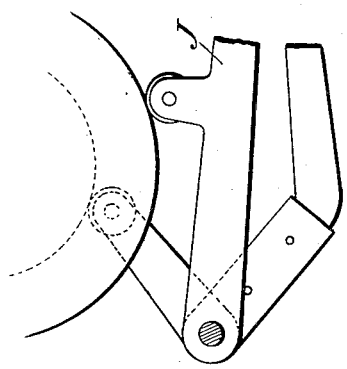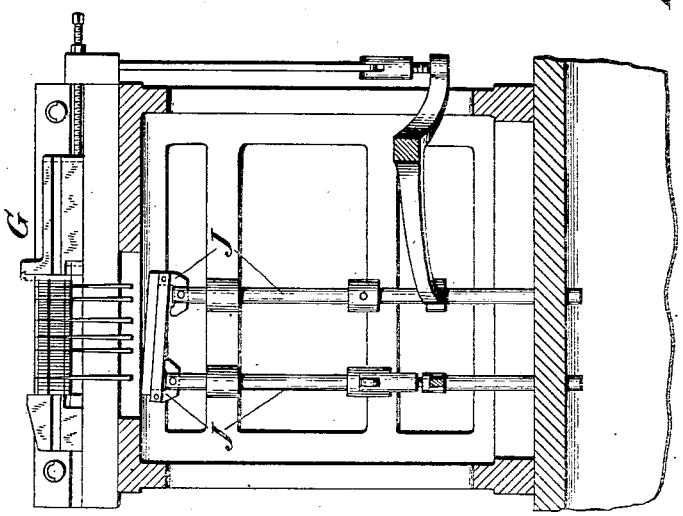

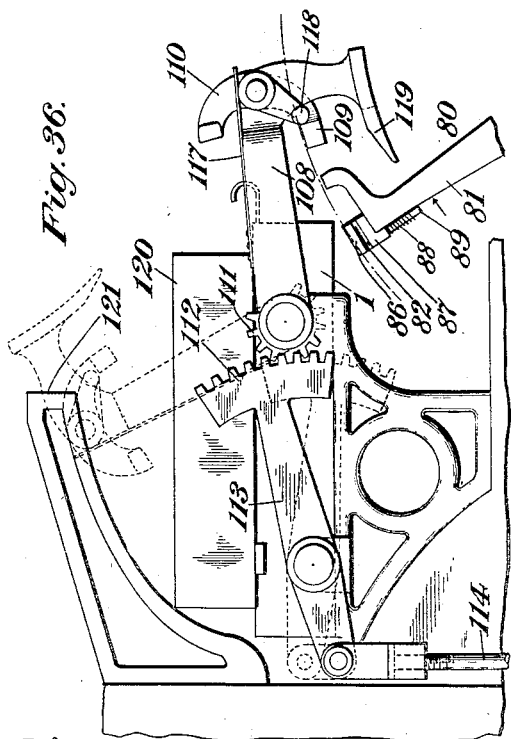

UNITED STATES PATENT OFFICE.

GEORGE R. CORNWALL, OF RYE, NEW YORK, ASSIGNOR, BY MESNE ASSIGNMENTS, TO JAMES G. COFFIN, TRUSTEE.

TYPOGRAPHIC MACHINE.

1,126,618.   Specification of Letters Patent.   Patented Jan. 26, 1915.

Application filed September 19, 1906. Serial No. 335,187.

*To all whom it may concern:*

Be it known that I, GEORGE R. CORNWALL, a citizen of the United States, residing at Rye, in the county of Westchester and State of New York, have invented new and useful Improvements in Typographic Machines, of which the following is a specification.

The invention relates to typographic machines and in many of its features more especially to typographic machines that produce composition units which print or impress upon a suitable impression-receiving surface a character or characters by the action of light.

Objects of the invention are to provide a machine of the character indicated and more particularly to provide a machine for producing a line composition unit which prints or impresses characters upon a suitable impression-receiving surface by the action of light; to provide a machine which will produce a composition unit of the kind indicated from a composed and justified line of types; to provide such a machine which will assemble a line of types, automatically justify the line, and then produce a composition unit of the character indicated from said line of types; to provide such a machine which will produce a negative from a line of assembled types and use same in producing a composition unit of the kind indicated; to provide means for permitting light to act upon a sensitized surface carried by a line bar, so as to impress a line of characters thereon, and means for regulating the length of exposure. These and other objects of invention will in part be obvious and will in part more fully appear herein.

The invention consists in the novel parts, combinations, arrangements and improvements herein illustrated and described.

The accompanying drawings, referred to herein and forming a part hereof, illustrate one embodiment of the invention, the same serving in connection with the description herein to explain the principles of the invention.

Figure 7:
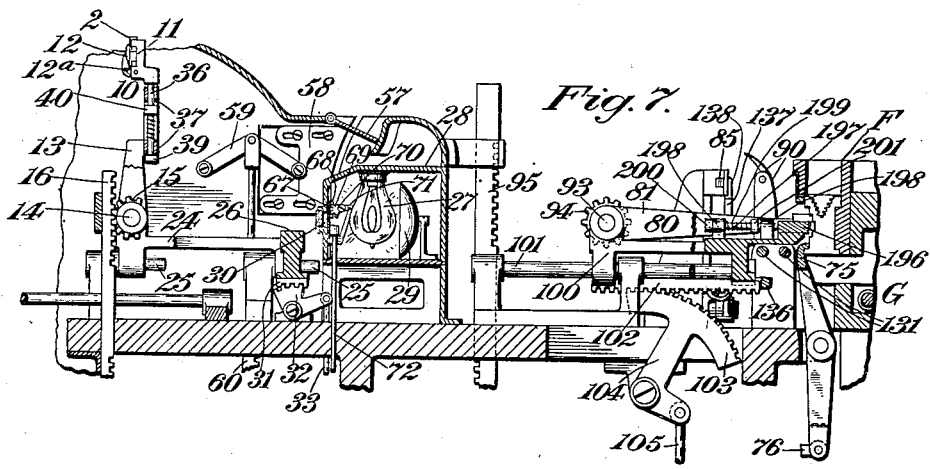
Figure 8:
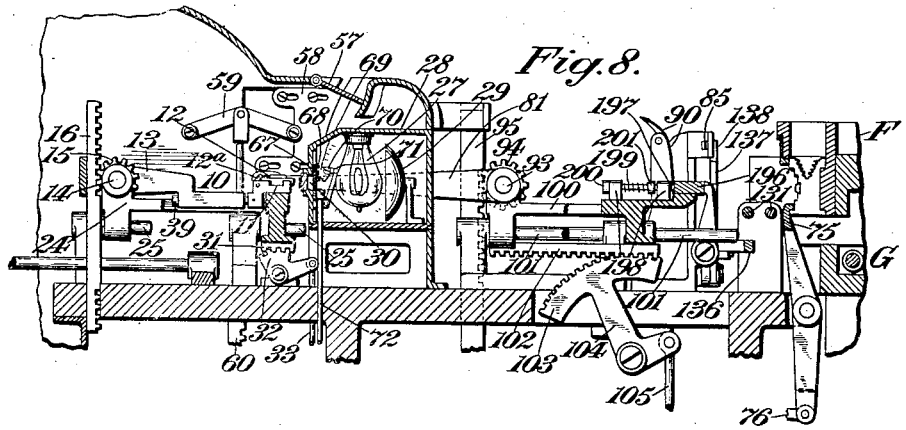
Figure 9:
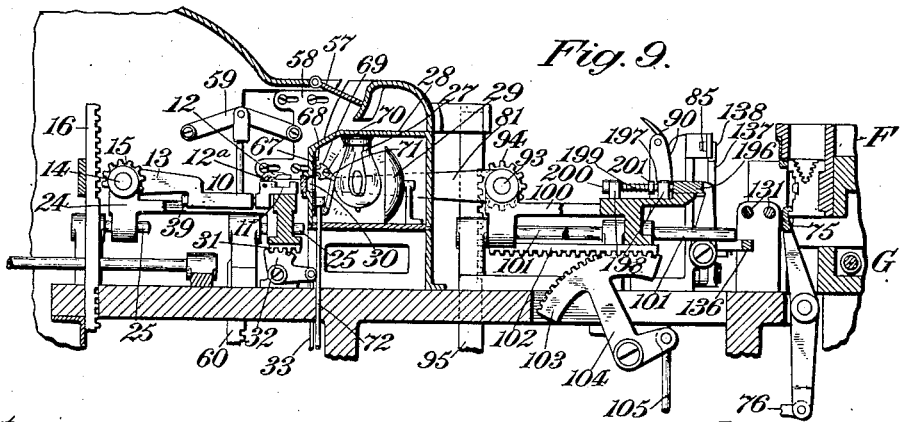

Of the drawings: Figure 1 is an end elevation of a machine constructed in accordance with the principles of the invention; Fig. 2 is a front elevation of such a machine; Fig. 3 is a sectional side elevation of such a machine substantially on the line A—B of Fig. 4; Fig. 4 is a partial plan view, partly in section, substantially upon the line C—D of Fig. 3; Fig. 5 is a fragmentary plan view showing principally an arrangement of cam shafts and other power devices with connections; Fig. 6 is a fragmentary plan view of the carriage, inking devices, line holding devices, developing devices, and other associated parts; Figs. 7, 8 and 9 are detail views, partly in section, of the carriage mechanism, the light mechanism, and other associated parts; Figs. 10, 11, 12, 12$^a$ and 13 are details of the light mechanism; Figs. 14, 15 and 16 are details of the strip-handling mechanism; Figs. 17 and 18 are details of the bar-feeding mechanism; Figs. 19, 20 and 21 are details of the receiving magazine and associated parts; Figs. 22 and 23 are detail views of the developing and associated devices; Figs. 24, 25, 25$^a$, 26, 27, 28 and 29 are details of the strip-handling mechanism and the inking mechanism; Fig. 30 is a detail plan view of the connection for controlling the power and cam shafts; Figs. 31 to 35 are details of the justifying mechanism; and Figs. 36 to 40 are detail views of parts of the strip-handling mechanism.

A machine constructed in accordance with one feature of the invention includes in combination means for holding a line bar having a surface susceptible to the action of light and means for impressing a line of characters upon the surface of the said bar by the action of light and the particular form of the impressing means may be such that the impressing action will be from light passing through the impressing means.

A machine constructed in accordance with another feature of the invention includes in combination means for composing and justifying a line of characters and impressing the said line of characters upon a surface of a suitable composing unit by the action of light.

Other features of the invention contemplate providing a machine having some of the features heretofore enumerated and having automatic means for "developing" a line bar, drying and storing it.

Another feature of the invention contemplates means for controlling the action of light upon the sensitive surface of the composition unit.

Other features of the invention will be fully set forth elsewhere herein.

In the machine illustrated in the accompanying drawings as being constructed in accordance with certain features of the invention, suitable devices are provided, as hereinbefore indicated, for handling a line bar having a light-sensitive surface which co-acts with means for impressing a line of characters upon the said light-sensitive surface of the bar by the action of light. In the present embodiment the arrangement and construction shown is such that the light passes through the impressing means in order to act upon the sensitive surface. In the present embodiment further the impressing means consists of a light-transmitting surface or material upon which the line of characters is carried, the line of characters and the surrounding surface having different properties with respect to the transmission of light.

A suitable source of supply for the line bars is provided, the form of such source shown in the drawings comprising a magazine 1 in which a series 2 of the line bars rests. Suitable devices for feeding the said bars from the magazine into the holding means for the line bar are provided. The form of such feeding devices illustrated herewith comprise pressure fingers 3 which serve to engage the bar and slide it from the magazine into the holding means. As herein shown, the said feeding means also comprise guides 4 upon which the supporting frame 5 for the fingers 3 are constructed and arranged to slide. In the illustrated arrangement there are two of the fingers 3 which engage the line bar at its ends and push it downwardly into the holding means which is at the proper time located directly beneath the magazine. Suitable means for keeping the series of line bars fed to the supply end of the magazine are provided, the specific form thereof not being shown or described herein as various forms of such devices are old and well known. The said feeding means are further shown as being provided with springs 6 serving to hold the frame 5 and its fingers 3 normally in their upward position. Links 7 are shown connecting the sides of the frame 5 with a rocking lever 8 which co-acts with a cam 9 upon a shaft 141, the cam serving to give the feeding devices their movement at the proper time with reference to the other parts of the machine.

The form of holding means for the line bar illustrated in connection with the present embodiment comprises a device, indicated generally by the reference numeral 10, which is constructed and arranged to receive the line bar from the magazine and feeding devices, as indicated, and to present same to the impressing means in order that the line of characters may be impressed upon the sensitive surface of the line bar by the action of light. The said device, as herein shown, carries the line bar from the magazine to what may be termed a light impression point and thereafter carries the line bar into operative relation with the developing agency as will be hereinafter more fully described. So far as concerns certain features of the invention it is immaterial in what manner the line bar and the impressing means are brought into operative relation as this might be done, for instance, while the line bar is still in the magazine, the magazine in such case serving as the holding means for the line bar. Referring more particularly to the illustrated form of the holding means, there is provided in the end thereof a seat 11 for the line bar and a clamping device 12 for holding the line bar to position after it has been fed into the holding means. The parts just described are shown as being supported upon arms 13 fixed to a shaft 14 having thereon a pinion 15 meshing at proper times with a rack bar 16. Suitable actuating connections are provided and are shown as comprising a geared sector 17 having pivoted thereto links 18 and 19. The link 18 is connected to a bell crank lever 20 co-acting with a cam 21 upon the shaft 141, while the link 19 is pivoted to a bell crank lever 22 the free end of said bell crank lever being in operative relation with a cam 23 upon the shaft 140. It will be noted that in the illustrated embodiment the relation of the pinion 15 and rack bar 16 is such that when they pass into engagement a suitable movement of the rack bar will serve to move the holding means 10 in either direction.

After the bar is received into the holding means it is first brought to the light-impressing position. Suitable means for effecting this are provided, and in the illustrated form thereof the shaft 14 and its pinion 15 are shown as being mounted upon a carriage 24 movable upon guides 25. The holding means 10 are thus rotatable into position upon the carriage so that it rests upon a seat 26.

The present embodiment of the machine comprises an artificial source of light 27, located within a casing 28 and shown with a reflector 29 in suitable relation thereto. A slot or aperture 30 is provided in the casing 28 for egress of the light. The mechanism is so arranged that the sensitive surface of the line bar is subjected to the action of light through the film or strip bearing the line of characters which, in the illustrated embodiment, constitutes the impressing means for the light-sensitive bar. The character-bearing strip is carried by suitable devices so that it is at the proper time interposed before the slot 30 in the casing 28 surrounding the light source. One purpose of the movement of the carriage 24 is to bring the surface of the bar and the character-impressing strip into close contact with each other and to the slot 30 or to the glass plate covering the slot 30. The use of a glass bar is preferable in many cases, as it gives a closer contact between the character-bearing strip and the bar to be printed.

Suitable means for giving movement to the carriage 24 are provided the particular form thereof herein shown comprising a rack bar 31 upon the carriage and a geared sector 32 mounted upon the frame of the machine, said sector being connected by a suitable link 33 with a lever 34 co-acting with a suitable cam 35 carried upon the shaft 141. There may be also provided, and there is shown herein, means for providing a nice contact through the entire length of the bar and of the slot 30 or its light-transmitting covering plate, said means comprising a yielding or spring mounting for the seat 11 with reference to the supporting arms 13 of the holding device 10 for the line bar. The particular form of such means shown herein comprises pins 36 (Fig. 7) fixed with reference to the seat 11 carried in guiding holes or ways 37 upon the arms 13 and being spring-impelled by a suitable stop such as 39. A tension-adjusting device, such as the turning head 40, for varying the tension of the spring may also be provided.

Any suitable sensitizer may be used for the surface of the line bars 2, so far as certain features of the invention are concerned, and a developer suitable for the particular sensitizer will be provided. Other features of the invention, however, have in contemplation the use of a liquid developer and other features of the invention provide, when desired, for the use of a liquid developer comprising several fluids or solutions. A form of developing means suitable for use with a liquid developer of several solutions is shown in connection with the illustrated embodiment. A receptacle for the developer is indicated herein generally by the reference numeral 41 and is shown with three compartments 42, 43 and 44. The construction or arrangement is such that after the line bar has been exposed to the action of light it may be subjected successively to the different fluids or solutions in the developer receptacle, and then be stored for use in proper order with respect to other line bars constituting a series embodying consecutive composed subject-matter.

As shown herein the holding means for the line bar and the developer receptacle are both movable for effecting the functions just indicated. The holding means 10, as has herein been described, is shown as being movable to the light-impressing point, and the relation of the pinion 15, the rack bar 16, and their connections are such that the holding means may be then swung over so that the surface of the bar will pass into the fluid or solution contained in the receptacle 41. The said receptacle, as previously noted, is shown with several compartments containing various fluids and the holding means 10 is shown as immersing the bar first in the solution in one compartment. In this embodiment the receptacle 41 is given a movement such as to bring the successive compartments into operative relation with the exposed bar and its holding means so that the bar may be immersed in the several compartments in succession. For this purpose suitable means are provided, the form thereof herein shown comprising a rack bar 45 (Figs. 22 and 23) fixed with respect to the receptacle and co-acting with a geared sector 46 pivoted at 47 and provided with gear teeth 48 meshing with a second geared sector 49 carried at one end of a pivoted lever 51 the other end of said lever coöperating with a cam 50 upon the shaft 140. The holding means 10 may be given an oscillatory motion which will serve two purposes, namely, to cause the bar to be in motion while in the developer, which, as is well known, serves to expedite the action thereof, and for the purpose of lifting the bar from one compartment to the other of the receptacle 41. This may be effected by the moving means therefor, and in this instance, it is effected by the conformation of the cam 23.

After the bar is developed it is then ready for storage prior to removal from the machine. For the purpose of receiving the bars a suitable magazine is provided, the arrangement and construction of said magazine and holding means being such that the bar will be automatically received into the magazine from the holding means. The receiving magazine herein shown is indicated by the reference numeral 52. The said magazine is further shown as being provided with devices for automatically receiving the line bar from the holding means, the form of such means illustrated comprising a cam groove 53 (Figs. 19, 20 and 21) which co-acts with the arm 12$^a$ to throw off the clamp 12 from the bar and being provided further with spring-pressed snap hooks 54 which permit the bar to pass into the magazine with the movement of the holder but retains it in the magazine as the holder moves away. The said magazine is mounted to rock for a purpose which will appear hereinafter and for the purpose of controlling its movement has pivoted thereto a link 202 connected to a bell crank lever 203 the free end of which is in operative relation with the cam 204 upon the shaft 140.

Suitable means are provided for shielding the sensitive line bar from the action of the light, said means comprising a casing 55. The lid or door 56 is shown in the casing for giving access to the developer receptacle 41. A swinging door 57 is shown for permitting the character-bearing strip to enter and to leave the casing, when as in the present embodiment the said strip is supplied from the exterior. Movable slides 58 (Fig. 3) are also provided which open to permit the carrier for the character-bearing strip to enter and close over the carrier as the sensitive bar is brought forward to the impression position. Suitable means for moving the said slide is provided, shown herein as comprising toggles 59 connected with rack bars 60 in mesh with geared sectors 61 fixed upon a shaft 62, said shaft being rocked through a crank arm 63 connected by a link 64 with a lever 65, co-acting with a suitable cam 66 carried upon the shaft 141. It will be understood that in many features of the invention other forms of character-impressing means than the strip may be used.

As hereinbefore indicated suitable means for regulating the amount of light-action to which a bar may be subjected are contemplated by the invention. For this purpose devices might be provided which would vary or control the quantity or quality of the light, and devices might likewise be provided which will vary the time of exposure, or various of these devices might be used together. In the present embodiment, however, this feature has been embodied in means for varying the time of the exposure. The form of such means illustrated comprises a slidable shutter 67 consisting of two parts slidable toward and from each other so as to open or close the slot 30 in the casing 28 so far as the passage of light is concerned. For the purpose of moving the said shutter 67 it is provided on one of its slidable parts with one or more straight racks 68 meshing with geared sectors 69 carried upon studs 70. Connected to the said sectors 69 are crank arms 71 which are connected by suitable links to the other slidable part of the shutter 67, said part having attached thereto a rod 72 pivoted to a lever 73 which co-acts with a suitable cam 74 carried by the shaft 141. Springs 72ª serve to restore the parts. The particular means shown herein for varying the time of exposure comprises devices for changing the conformation of the cam 74. The said cam, as is shown clearly in Fig. 12ª, may consist of two disks having a screw-and-slot adjustment whereby they may be adjusted in various relative positions so as to change their contour and thus vary the movements of the actuating mechanism for the shutter 67 so that it may remain in the open position a greater or less length of time, according to such adjustment.

It is immaterial, so far as many features of the invention are concerned, how the line of characters is imposed upon the impressing means which carries said line of characters, and furthermore according to certain features of the invention it is immaterial whether the impressing means permanently carry the characters to be used as, for instance, where types which themselves are adapted to impress by the action of light are employed, or whether means for placing the line of characters upon the impressing means are provided, as for instance where a strip is impressed with a line of characters and is then used to impress a sensitive bar. In the present embodiment of the invention, means are provided for composing and justifying a line of types and impressing the said line of types upon a suitable strip which may serve as the impressing means carrying the line of characters. So far as certain features of the invention are concerned, however, the line of types themselves may serve as the impressing means.

The specific form of the devices for composing a line of type shown in the illustrated embodiment, simply as such, does not constitute a part of the invention. The form of composing devices shown herein are substantially those of the well-known linotype machine. Only a general description of these devices will be given herein. A magazine comprising a plurality of compartments in which the various types to be used are stored is indicated generally by A. Suitable devices for selecting from the respective compartments of the magazine the characters desired in a given composition are provided, said mechanism being controlled from the keyboard B and serving to release the characters from the magazine, in the illustrated mechanism, by the coöperation of the action of gravity. The action of the said parts is such that upon the operation of the keys, the type bearing the corresponding characters are released from the magazine and transferred to their proper places in the line which is in process of assembling. The line is assembled in a device commonly styled an assembling block and indicated in the drawings by C. Space bands, which may be of a well-known type, are stored in a magazine D and are fed by suitable mechanism into proper relation with the letters in the assembling block C so as to occupy the interverbal spaces in the line. After a complete line has been assembled it is elevated to the guide E and from thence to the vertically movable yoke F and from thence the line is carried to the clamping devices G. Here the line is positioned for the impression and is justified by the justifying mechanism J. The clamping devices G serve to hold the assembled and justified line firmly in position for the impression. The type used may be generally similar in form to the well-known matrix of the linotype machine, being provided with shoulders for coöperating with the magazine escapement mechanism, the alining devices, and having also distributing devices. The type will, however, be provided with a type face, either relief or intaglio, which is adapted for printing rather than casting.

Suitable devices are shown herein for alining the composed and justified line of types prior to the impression, said devices being shown as comprising a member 75 (Figs. 3, 33 and 34) adapted to engage the forward heel of the line of types prior to the impression and to move out of engagement therewith before the line is removed for distribution, the said member being actuated, by suitable connections, from one of the cam shafts. As herein shown, a link 76 leads from the aliner to a bell crank lever 77 the free end of which is in operative relation with a cam 77ª carried upon the shaft 140.

In the illustrated embodiment the strip bearing the line of characters which is used to impress the sensitive line bar is imprinted from the line of types in such manner that the line of characters upon the strip and the surrounding surface have opposite properties with respect to the transmisison of light. The strip may be regarded as carrying a line of opaque characters the surrounding surface being to a greater or less degree light transmitting. In carrying out the features of the invention just indicated suitable devices are provided for handling the character-bearing strip, which may be designed to carry a single line of characters and may be termed a line strip, although the said character-bearing strip may be of any convenient form or extent. Suitable inking devices are also provided for coöperating with the line of types so as to place a line of opaque characters upon the said line strip. The particular form of strip-handling means herein shown comprises a roll 78 of paper, celluloid, or other suitable material, supported on the machine at a convenient point. The strip of material, designated by the reference numeral 79, is brought forward into a position contiguous to the handling means for the strip so as to be engaged thereby. In the illustrated embodiment a section of the strip sufficient for a line of characters is severed from the web 79 and the severed portion is then carried forward into impression.

The form of the device shown herewith for handling the strip as it undergoes the various operations to which it is submitted in the machine comprises a carrier, indicated generally by the reference numeral 80. Said carrier is provided with arms 81 and with spring-pressed clamping jaws 82. The said carrier is adapted to take the line strip, to hold it during impression, and to then take the strip bearing the line of characters and carry it to the light-impressing point and then to pass it over to a receiving mechanism preparatory to again passing through the cycle of operations indicated. Suitable devices are shown herein for feeding the strip 79 into position to be taken by the jaws 82 of the carrier 80. The form of such means illustrated comprises an automatically acting clamping jaw 83 adapted to reciprocate to and fro near the impression point for the line of types. The said jaws are mounted upon a bracket 84 which for convenience is carried upon the inking carriage soon to be described in order to have its requisite to-and-fro motion. As the said jaw approaches the protruding end of the strip 79, a cam shape 85 throws the jaws open, as shown in Fig. 27, so that as they recede from the cam shape 85 the jaws close upon the strip carrying it with them. The clamping jaws 83 come to rest at the far end of their travel prior to the descent of the carrier 80 with its spring jaws 82 ready to take the strip 79. The said jaw 82 comprises, as herein shown, two members which are spring-impelled into engaging position so as to firmly hold an interposed object, such as the strip 79. Devices for causing the said spring jaws to separate and receive the strip between them are provided, a form thereof being clearly shown in Figs. 14, 15 and 16 of the drawings. The members 86 of the spring jaws 82 are slidably mounted on pins passing through guides in the member 87 of the jaws 82. The spring 88 serves to normally hold the jaws in engaging position. As the member 80 swings downwardly into engaging position the ends of the pins 89 encounter cam shapes 90 which force the pins 89 outwardly against their springs 88 separating the jaws. With the jaws thus open the carrier 80 passes downwardly over the strip 79 which then lies between the jaws. The pins 89 then ride off the cams 90 and the jaws snap together upon the strip 79. Cutting edges 91 (Fig. 4) are carried upon the fixed member 87 of the jaw so that the closing movement of the member 86 serves to sever the line portion from the strip 79. The pins 89 are offset at their ends, as clearly shown in Fig. 4 of the drawings, so that as they pass outwardly they will clear the cams 90 and will not be actuated thereby. The upper part 92 of the cams 90 are shown as yieldable against spring pressure to permit the pins 89 to pass by on their upward movement.

Suitable means are provided for giving the carrier 80 its desired motion and the form of such means herein shown comprises a shaft 93 to which the arms 81 are fixed, the said shaft carrying, also fixed thereto, a pinion 94 engaging a rack bar 95. The rack bar 95 engages a geared sector 96 which connects by a link 97 with a lever 98 coacting with a suitable cam 99 upon the shaft 141. This train of mechanism gives the carrier 80 its angular movement from the point where it takes the line strip to the point to which it carries the strip for the impression of the light-sensitive surface of the bar, and then to return to its final position. Before so carrying the strip, however, the strip and the line of types is brought into impression contact in order that the strip may be impressed with the line of characters from the line of types. This is effected in the present embodiment by moving the strip forward into contact with the stationary line of types and for this purpose a carriage 100 is provided upon which the carrier 80 and its shaft 93 are mounted. The said carriage slides upon ways 101 and means are provided for sliding it forward to impression and for returning it. The form of such means herein shown comprises a rack bar 102 upon the carriage which meshes with a geared sector 103 carried upon a bell crank lever 104, connected by a suitable link 105 with a lever 106, which co-acts with a suitable cam 107 upon the shaft 141.

In order to provide a suitable backing for the strip 79 during the impression there is mounted upon the carriage a platen 196. For the purpose of affording a yielding and uniform action for the impression throughout the entire length of the line, the said platen is shown as having a spring mounting with reference to the carriage 100 and it may also be provided with a yielding face. The particular form of mounting herein shown comprises pins 197 integral with the platen and passing through holes in lugs 198 on the carriage. The platen is impelled in one direction by springs 199 the pins 197 being furnished with stops 200 to limit their movement. Turning heads 201 are provided for adjusting the tension of the springs 199.

After the line has been impressed upon the strip the carrier 80 swings it into position to impress the sensitive line bar, as previously indicated, and upon the return movement of the carrier the strip is removed from the carrier preparatory to its swinging forward to receive another strip. Suitable devices for removing the strip are provided the said devices comprising a gripper 108 shown herein as provided with a fixed jaw member 109 and a movable jaw member 110. Upon the shaft of said gripper member there is fixed a pinion 111 meshing with a geared sector 112 carried upon a lever 113 which is connected by a link 114 to a lever 115 coöperating with a cam 116 upon the shaft 141. The movable jaw 110 is provided with a device for holding it in the open or closed position, such as the leaf spring 117 coöperating with cam faces upon the said jaw 110. The jaw is also provided with a trip finger 118 for throwing it open or shut. As the carrier 80 returns, a cam face 119 upon the gripper member 108 serves to lift the movable jaw 86 away from the jaw 87, the carrier 80 in turn striking the tripper 118 to close the jaw 110. The member 108 is then actuated through the pinion 111 and the geared sector 112 so as to swing it away carrying the used line strip with it. The gripper 108 then swings into position above the receptacle 120. In this position the trip encounters a cam 121 and is thrown open, dropping the strip into the receptacle 120. The gripper 108 is out of the path of the carrier as it swings backward with a new strip to the light impressing point.

Devices for inking the line of types of any suitable or convenient form may be provided, said devices being shown herein as comprising a distributing plate 122 (Fig. 4), and vibrating rolls 123 and 124 which serve to supply the ink rolls 125 of a carriage 126 with ink. The inking system is suitably driven from a shaft 127, through the pulley 128, the belt 129, pulley 130 and suitable gearing, which need not be described in further detail herein. The inking carriage 126 reciprocates upon guides 131. For driving the said carriage there is pivoted thereto a link 132 (Figs. 24 and 25), said link being also attached to an arm 133 which is actuated by a pin-and-slot connection with a disk 134. The said member 134 also serves, in this embodiment, as a cam to actuate a lever 135 connected by a link 136 to a geared sector 137 engaging a rack 138 which serves to give a slight backward movement to the cam 85. The clamping jaw 83 is thus permitted to close firmly upon the strip 79 before the jaw 83 and bracket 84 start upon their return movement with the inking carriage.

According to certain features of the invention suitable devices for distributing the line of types when it is no longer required in the machine are contemplated. So far as regards many features of the invention, any suitable devices may be provided. The particular form of such mechanism herein shown is substantially the same as that of the said linotype machine and need not be described in detail. Said devices comprise a receiving slide K to which the line of types is elevated by the yoke F. The line is here transferred to the elevator L and carried upward and then delivered to the receiving devices proper, designated by the reference character M, and are redistributed to the corresponding compartments of the magazine.

A cleaning device for the types may be used, if desired, and there is shown generally in the drawings herewith such a device, indicated by the reference character N, same being substantially similar to that described in detail in application for patent Ser. No. 203713 of A. L. Saltzman filed April 18, 1904.

Suitable drying means for the line bars after they have been developed may be provided and a form of such means is herein shown as a blower 139 which directs a current of air upon the surface of the bars as they stand in the magazine 52. Other forms of driers may be employed if desired.

Suitable driving and controlling means for the various parts are provided, and the said means as herein shown comprise two cam shafts, 140 and 141. The said cam shafts are suitably connected to a source of power and to each other so that the various functions of the machine will be performed in proper sequence with respect to each other. The pinion 142 on a power shaft 143 meshes with a gear wheel 144 on the shaft 140. Loosely sleeved upon the shaft 143 is a constantly rotating pulley 145 driven from a suitable source of power. Between the shaft 143 and pulley 145 there is a clutch connection 146. The said clutch, as shown, is fixed to the shaft 143 and is controlled by an arm 147 which swings on its shaft 148, permitting the spring 149 to carry clutch 146 into engagement with the pulley 145, thereby starting the shaft 143 into rotation. To the shaft 148 is fixed an arm 150 which has a pin-and-slot connection with the end of a slidable rod 151, hereinafter referred to. Pivoted also to the said shaft 148 is an arm 152 arranged to be normally in position to engage the stop latch 153 carried by a control wheel 154 on the shaft 140. Contiguously mounted to the mechanism just described is a shaft 155 having an arm 156 thereon adjacent to the arm 152 and having another arm 157 in position to be engaged by a lug 158 upon the rod 151. The shaft 155 is held in position by suitable means such as a spring 159. A connection is provided for automatically calling the said parts into movement when the line is elevated from the assembling point to the slide E on its way to the alining and justifying devices. The said connections comprise a rock shaft 160 having an arm operatively connected to the line-elevating mechanism and an arm adapted to release latch 153 through the action of arm 156 so as to free shafts 140 and 143 for rotation and allow the arm 147 to move so as to permit the clutch 146 to be thrown in by its spring 149. A suitable hand-controlling device 161 may be attached to the slidable rod 151, so that the said parts may be manually controlled, if desired. For this purpose the lug 158 on rod 151, hereinbefore mentioned, is constructed and arranged to act on arm 157 and through shaft 155 and arm 156 to release the latch 153. After a line has been assembled the operator by means of the handle B' moves the line from the assembling point to the guide E and the shaft 160 is also rotated so as to throw in the clutch 146 and release the latch 153 so that the shafts 140 and 143 are connected and free to rotate with the driving pulley 145, as just described.

As will be apparent from the preceding description, in the illustrated embodiment, parts of the duties of the machine are controlled by different cam shafts, a part of the said duties being controlled by the shaft 140 or by the shaft 141 or a part by the shaft 162. The duty of the shaft 162, as herein shown, is in connection with the inking mechanism and the feeding out of the strip 79. The shaft 162 is driven by a belt-and-pulley connection from a shaft 163 suitably connected with the source of power. The shaft 162 is constantly rotating and has contiguous thereto a shaft 164 upon which is mounted the cam 134 hereinbefore mentioned. A device for permitting a single rotation of the shaft 164, so as to call into action the inking carriage 126 and the clamp 83 at the proper time in the operation of the machine is provided. The particular form of such device herein shown consists of a pawl and ratchet device, the pawl 165 being mounted upon the shaft 164 and the ratchet 166 being mounted upon the shaft 162. A cam lug 167 serves to normally hold the pawl out of the ratchet against the action of a suitable spring. As herein shown a tripping lever 168 operated by a finger 169 carried for convenience upon the elevator cam carried on the shaft 140 serves to trip the cam lug 167 at the proper time to permit the pawl 165 to engage with the ratchet 166 so as to give a single rotation to the shaft 164 as just described. A cam face 170 upon the cam lug 167 serves to again throw out the pawl from the ratchet at the end of the rotation. A suitable checking pawl 171 may be provided for the shaft 164. In the illustrated embodiment it has been found convenient to arrange the duties placed upon the various shafts so that the shaft 140 will call into action the shaft 164 and the shaft 141, the shaft 141 again in turn calling into action the shaft 140. This arrangement may be varied as found convenient in various embodiments of the invention. For the purpose of calling into action the shaft 141 when the shaft 164 comes to rest, suitable means are provided, the particular form thereof herein shown comprising a lug 172 upon the cam disk 134 which serves to trip the lever 173 which in turn trips a lever 174 connected by a link 175 with a spring-held crank arm 176 upon a shaft 177. Fixed to the pulley drive 145, in the present embodiment, is shown a gear 178 meshing with an intermediate 179 which in turn meshes with a gear 180 running loosely upon the shaft 181. Fixed upon the shaft 181 is a gear 182 meshing with a gear 183 upon the cam shaft 141. The shaft 181 and therefrom the shaft 141 are brought into action by means of a clutch connection 184 between the loose gear 180 and the shaft 181. The said clutch is shown as a spring-controlled clutch normally held out of relation with the shaft by an arm 185. Upon the shaft 141 there is also a control wheel 186 having a latch device 187 for controlling the rotations of the said shaft in harmony with the shaft 181 and the other portions of the machine. Fixed to the shaft 177 is a crank arm 188 connected by a suitable link train to a two-armed lever 189 which serves as a release for the latch 187 which is normally stopped by the free end of the lever 185. When the latch 187 is released from the lever 185 and passes out of engagement therewith the lever 185 in turn is free to move so as to permit the clutch 184 to connect the gear 180 with the shaft 181. The latch 187, upon one rotation of the shaft 141 again engages the lever 185 the said parts being so shaped that the latch serves to cam the lever so as to throw the clutch 184 out of engagement, the lever in turn serving as a stop for the latch. Just prior to the shaft 141 coming to rest it calls into action the shaft 140 and means for effecting this are provided, the form thereof shown comprising a pin 190 upon gear wheel 183, the said pin being adapted to co-act with a cam face upon an arm 191 carried on a shaft 192 to which shaft there is also fixed an arm 193 which co-acts with a lug 194 upon the slidable rod 151, the movement of the said rod, as will be understood, serving to act through the lug 158 and the arm 157 to set the controlling mechanism for the control wheel 154 into motion. A second stop latch 195 is provided upon the wheel 154 in the present embodiment as it has been found convenient to arrest the shaft 140 after a partial rotation.

The manner of operation of the mechanism herein described is substantially as follows: The mechanism of the keyboard B is operated in the well-known manner so as to cause the types corresponding to the various keys which are actuated to escape from the magazine A and to be assembled in the order of the actuation of the keys in the assembling block C. The space bands are also fed down from their magazine D into the assembling block in their proper places with reference to the types, so as to separate the words in the line. The operator then by moving the lever B' lifts the assembling block into line with the guide E and the line is then carried by suitable mechanism to the yoke F and is then positioned by the yoke in proper relation to the clamping devices G and the justifying devices J. The line is then justified and clamped in position. Certain of these functions and other following functions are performed from the cam shafts 70 and these shafts are called into action at the proper times. This is effected by the operator lifting the composed line to the guide E, the shaft 160 being rotated so that through its operative arm it causes the arm 156 to move the latch 153 against its spring and thus release arm 152 and, through shaft 148 to cause lever 147 to move back, permitting the clutch 146 to connect shaft 143 with the pulley 145. The pulley 145 then serves to drive the shaft 143 and, through the pinion 142 and gear 144, the shaft 140. Certain cams upon the shaft causes the justification and alinement of the line which is securely clamped in position by the action of the proper mechanism during a partial rotation of the shaft. At about this time the latch 195 comes in contact with the arm 152 and the pin 169, carried for convenience upon the elevator cam, trips the lever 168. The latch 195 brings the shaft 140 to rest and through the train of mechanism hereinbefore described throws out the clutch 146. The lever 168 trips the pivoted cam lug 167 and the pawl 165, which is fixed relatively to the shaft 164, under the impulsion of its spring, engages with the ratchet 166 upon the constantly rotating shaft 162. The rotation of the shaft 164 carries with it the cam disk 134 and the inking carriage passes across the face of the line of types the bracket 84 going therewith. The spring clamp 83 contacting with the cam shape 85 opens to receive between its jaws the end of the strip 79. The cam shape 85 is then retracted by means of the rack 138 and geared sector 137 which receives movement through the link 136 and lever 135 from the cam disk 134. The withdrawal of the cam shape 85 permits the clamp 83 to close firmly on the end of the strip 79. The inking carriage and bracket 84 then move in the other direction the spring clamp 83 carrying with it the strip 79 which unwinds from the roll 78. As the movement of the mechanism just described is nearing completion the lug 172 upon the cam disk 134 trips the lever 173 which in turn guides the lever 174 which, through its link 175, rocks the arm 176 against its spring, the shaft 177 rocking with its said arm 176. The arm 188 rocking with the shaft 177 oscillates the lever 189, the movement of which frees the stop latch 187 of the control wheel 186 from the arm 185, the stop latch in moving away permitting the arm 186 to give before the spring of the clutch 184, so that the clutch throws into operative relation the gear 180 and the shaft 181. The shaft 181 then sets in motion the cam shaft 141 through the gears 182 and 183. The strip carrier 80 then moves downwardly substantially from the position shown in Fig. 3 under the impulsion of its rack 95, the sector 96 which is actuated through link 97 and lever 98 from cam 99. As the strip carrier swings downwardly the ends of the spring fingers 89 contact with the cams 90 and are pushed outwardly against their springs 88 moving the jaw 86 away from the jaw 87, the open jaws then passing on either side of the strip 79. As the strip carrier 80 comes to rest in its seat upon the carriage the fingers 89 pass from the cams 90 and snap back under the action of their springs so that the strip 79 is firmly gripped between the jaws 86 and 87. A knife edge upon the fixed jaw 87 severs the line portion, from the remainder of the strip 79. The line portion of the strip 79 is then in position against the platen 196 and the carriage is moved forward to impression through the motion of the geared sector 103 actuated through its link 105 and its lever 106 from its cam 107 upon the shaft 141. The carriage then moves backward to its initial position as shown in Fig. 3. The strip carrier 80 then swings upwardly and backwardly toward the light impression point for the purpose of impressing the light-sensitive bar. While some of these functions have been in progress the holding means 10 for the line bar have moved into a position with reference to the magazine 1 and the pusher fingers 3 have pushed a line bar into the seat 11, the feeding-in device being moved downwardly on its guide 4 against the springs 6, being actuated through the link 7 and lever 8 by its cam 9 upon the shaft 141. Upon receiving the bar the holding means 10 is swung downwardly into position at the light impressing point as shown in Fig. 8 of the drawings. In the meantime the strip carrier 80 has swung backwardly, the swinging door 57 giving way to permit it to pass and then closing, the plates 58 then moving up to close the side slots. The strip carrying its line of characters is then in position before the slot 30. The holding means 10 as it swung forwardly and downwardly was positioned upon the seat 26 and the carriage 24 is thereupon moved forward through the action of the rack 31, geared sector 32, actuated through link 33 and lever 34 from a cam 35 upon shaft 141. The face of the line bar and of the line strip are then in close contact against the slot 30 or its glass cover. At this time the slide 67 is moved through its rack 68 and the geared sector 69, actuated through link 72 and lever 73 from cam 74 on shaft 141. The slide 67 then closes. The holding means for the line bar is swung upwardly and backwardly until the exposed surface of the bar is immersed in the first solution in the receptacle 41. The holding means 10 then have a slight vibratory motion for moving the bar backward and forward in the developer, the said motion being imparted to it through the rack bar 16, geared sector 17, link 19, lever 22 and cam 23. The receptacle 41 is then set in motion by means of the geared sector 46 acting upon the rack 45, the said sector receiving its movement from the lever 51 and cam 50. The movement of the holding means 10 and receptacle 41 is so timed that as the receptacle moves backwardly the bar is lifted over the partitions in the receptacle 41 from one compartment to the next. Upon the completion of the development the bar is swung upwardly into operative relation with respect to the magazine 52, the magazine being at the same time swung downwardly through its link 202, lever 203 and cam 204 upon shaft 140. The holding means then moves against the end of the magazine, the arm 12$^a$ entering the slot 53 to throw away the clamp 12 from the bar, the spring detents or hooks 54 engaging the bar on its outer side and holding it as the member 10 moves away and back into operative relation with the magazine 1. The blower 139 may act upon the line bars in the magazine to hasten the drying action. In the meantime the strip carrier 80 has moved backwardly along its path toward its initial position and in doing so encounters gripper 108 which has been moved by its actuating mechanism, including the pinion, 11, the sector 112, lever 113, link 114, and their associated parts into the path of the strip carrier. The spring finger 89 riding upon the cam 119 causes the jaws 86 and 87 to separate and at the same time the strip holder striking the tail 118 brings the jaw 110 and the jaw 109 together upon the strip. The strip holder then passes on and the gripper 108 swings upwardly carrying the strip until it is in position above the receptacle 120. The lug 121 then trips the tail 118 throwing the jaws 109 and 110 apart and the strip is dropped into the receptacle. The gripper then remains in its upper position until the strip carrier has passed again on its way toward the light impressing point. The line of types has in the meantime been elevated from the impression point to the guide K and is carried thence by the elevator L to the distributing mechanism M. It may here be subjected to the action of the cleaning devices if desired. At the proper point in the cycle of operations the pin 190 has contacted with the cam face upon the arm 191 rocking the shaft 192 and therewith the arm 193 so as to actuate the bar 151 and in the manner hereinbefore set forth calling into action again the shafts 143 and 141. In the meantime the shafts 181 and 141 are brought to rest by the action of the stop latch 187 and arm 185.

From all the foregoing it will be understood that a machine has been provided in accordance with the principles of the invention which realizes the objects of invention and advantages set forth, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A typographic machine including in combination means for holding a sensitized line bar, impressing means comprising a line of characters, and means for exposing the line bar to the action of light through the said impressing means.

2. A typographic machine including in combination means for holding a sensitized line bar, impressing means comprising a line of characters, means for exposing the line bar to the action of light through the said impressing means, and means for regulating the amount of exposure.

3. A typographic machine including in combination means for holding a sensitized line bar, impressing means comprising a line of characters, means for exposing a line bar to the action of light through the said impressing means, and means for developing the line bar.

4. A typographic machine including in combination means for holding a sensitized line bar, impressing means comprising a line of characters, means for exposing a line bar to the action of light through the said impressing means, means for developing the line bar, and means for drying the line bar.

5. A typographic machine including in combination means for composing a line of types, means for automatically justifying the line of types, means for holding a line bar, and means for impressing the matter of the line of types upon a sensitized line bar by the action of light.

6. A typographic machine including in combination means for composing a line of types, means for automatically justifying the line of types, means for holding a line bar, means for impressing the matter of the line of types upon a sensitized line bar by the action of light, and means for regulating the amount of exposure.

7. A typographic machine including in combination means for composing a line of types, means for automatically justifying the line of types, means for holding a line bar, means for impressing the matter of the line of types upon a sensitized line bar by the action of light, and means for developing the line bar.

8. A typographic machine including in combination means for composing a line of types, means for automatically justifying the line of types, means for holding a line bar, means for impressing the matter of the bar, means for impressing the matter of the line of types upon a sensitized line bar by the action of light, means for developing the line bar, and means for drying the line bar.

9. A typographic machine including in combination a sensitized line bar, impressing means carrying a line of characters, means for exposing the line bar to the action of light through the impressing means, a receptacle for a liquid developer, and means for placing the exposed line bar in the developer.

10. A typographic machine including in combination a sensitized line bar, impressing means carrying a line of characters, means for exposing the line bar to the action of light through the impressing means, a receptacle for a liquid developer, means for placing the exposed line bar in the developer, and means for removing the line bar from the developer after development.

11. A typographic machine including in combination a sensitized line bar, impressing means carrying a line of characters, means for exposing the line bar to the action of light through the impressing means, a receptacle for a liquid developer, means for placing the exposed line bar in the developer, means for removing the line bar from the developer after development, and means for drying the line bar.

12. A typographic machine including in combination a sensitized line bar, impressing means carrying a line of characters, means for exposing the line bar to the action of light through the impressing means, a receptacle having compartments for holding several liquids, and means for placing the exposed line bar successively in the several liquids.

13. A typographic machine including in combination a sensitized line bar, impressing means carrying a line of characters, means for exposing the line bar to the action of light through the impressing means, a receptacle for a liquid developer, and means for moving the line bar through the developer.

14. A typographic machine including in combination means for composing a line of types, means for justifying the line of types, means for making a negative from the line of types, means for holding an impression-receiving surface, and means for causing said negative to impress the line of characters upon said impression-receiving surface by the action of light.

15. A typographic machine including in combination means for composing a line of types, means for justifying the line of types, means for making a negative from the line of types, means for holding a line bar having a sensitized surface, and means for causing said negative to impress the line of characters upon said line bar by the action of light.

16. A typographic machine including in combination means for composing a line of types, means for justifying the line of types, means for making a negative from the line of types, means for holding an impression-receiving surface, means for causing said negative to impress the line of characters upon said impression-receiving surface by the action of light, and means for developing the said impression-receiving surface.

17. A typographic machine including in combination means for composing a line of types, means for justifying the line of types, means for inking the line of types, means for impressing the inked line of types upon a translucent surface, means for holding a light-sensitive impression-receiving surface, and means for impressing the line of characters from the translucent surface to the said light-sensitive surface by the action of light.

18. A typographic machine including in combination means for composing a line of types, means for justifying the line of types, means for inking the line of types, means for impressing the inked line of types upon a translucent line strip, means for holding a light-sensitive impression-receiving surface, and means for impressing the line of characters from the translucent line strip to the said light-sensitive surface by the action of light.

19. A typographic machine including in combination means for composing a line of types, means for justifying the line of types, means for inking the line of types, means for impressing the inked line of types upon a translucent surface, means for holding a line bar having a light-sensitive surface, and means for impressing the line of characters from the translucent surface to the said line bar by the action of light.

20. A typographic machine including in combination means for composing a line of types, means for justifying the line of types, means for inking the line of types, means for impressing the line of types upon a translucent strip, means for holding a line bar having a light-sensitive surface, means for bringing the translucent printed strip into contact with the sensitive surface of the line bar, and means for exposing them to the action of light.

21. A typographic machine including in combination means for composing a line of types, means for justifying the line of types, means for inking the line of types, means for impressing the line of types upon a translucent strip, means for holding a line bar having a light-sensitive surface, means for bringing the translucent printed strip into contact with the sensitive surface of the line bar, means for exposing them to the action of light, and means for developing the line bar.

22. A typographic machine including in combination means for composing a line of types, means for justifying the line of types, means for inking the line of types, means for impressing the line of types upon a translucent strip, means for holding a line bar having a light-sensitive surface, means for bringing the translucent printed strip into contact with the sensitive surface of the line bar, means for exposing them to the action of light, and means for controlling the action of the light.

23. A typographic machine including in combination means for composing a line of types, means for justifying the line of types, means for inking the line of types, means for impressing the line of types upon a translucent strip, means for holding a line bar having a light-sensitive surface, means for bringing the translucent printed strip into contact with the sensitive surface of the line bar, means for exposing them to the action of light, means for controlling the action of the light, means for developing the line bar, and means for distributing the types.

24. A typographic machine including in combination means for handling a light-sensitive impression-receiving surface, means for protecting the said surface from the action of light, impression means comprising a line of characters, means for bringing the said impression-receiving surface and the impressing means into operative relation, and means for permitting the source of light to act to transfer the line of characters to the said light-sensitive character-receiving surface.

25. A typographic machine including in combination means for handling a light-sensitive impression-receiving surface, means for protecting the said surface from the action of light, impressing means comprising a line of characters, means for bringing the said impression-receiving surface and the impressing means into operative relation, and means for permitting the source of light to act to transfer the line of characters to the said light-sensitive character-receiving surface, and means for determining the duration of the said light action.

26. A typographic machine including in combination means for composing a line of types, means for justifying the line of types, means for inking the line of types, a light-proof magazine for holding a series of line bars, means for holding a translucent impression-receiving surface, means for impressing the line of types upon the said translucent impression-receiving surface, means for bringing the said impressed surface and the sensitized face of the line bar into contact, a source of light, means for causing the light to act upon the line bar through the said translucent surface, means for developing the line bar, and means for protecting the line bar from the action of light until after development.

27. A typographic machine adapted to act upon a light-sensitive bar including in combination means for impressing a line of characters upon the face of the bar by the action of light, holders for a plurality of solutions, and automatic means for dipping the bar successively into different solutions.

28. A typographic machine including in combination means for composing a line of types, means for justifying the line of types, means for inking the line of types, means for carrying a line strip, means for bringing the line strip and the inked line of type into impression contact, automatic means for discharging the strip into a receiver, and means for supplying a new line strip to the said line strip holding means.

29. A typographic machine including in combination means for composing a line of types, means for justifying the line of types, means for inking the line of types, means for holding a line strip, means for bringing the line strip and the inked line of types into impression contact, a light-protected magazine for holding light-sensitive line bars, means for bringing a line bar and the impressed strip into operative relation, means for impressing the line of characters from the strip to the line bar by the action of light, means for discharging the strip from its holder, means for developing the line bar, and means for distributing the line of types.

30. A typographic machine including in combination means for impressing characters upon successive light sensitive surfaces by the action of light, a developer container, and means for taking the successively light-impressed surfaces and immersing them in the developer in said container.

31. A typographic machine including in combination means for impressing characters upon successive light sensitive surfaces by the action of light, a developer container and means for taking successive line bars which have been impressed by said impressing means and immersing each line bar in the developer in said container.

32. A typographic machine including in combination means for impressing characters upon successive light sensitive surfaces by the action of light, a developer container having a plurality of compartments and means for taking the successively light impressed surfaces and immersing each in said various compartments.

33. A typographic machine including in combination means for impressing characters upon successive light sensitive surfaces by the action of light, a developer container having a plurality of compartments and means for taking the successive line bars which have been impressed by said impressing means and immersing each line bar in the developer in said compartments.

34. A typographic machine including in combination a line of types, means for taking an impression from said line of types upon a light sensitive surface by contact with said surface and means for developing said surface.

35. A typographic machine including in combination a line of types, means for impressing said line of types upon a light sensitive surface by contact with said surface, developing means and means for causing said developing means to act on said impressed sensitive surface to develop it.

36. A typographic machine including in combination means for composing successive lines of types, means for impressing same a line at a time upon successive light sensitive surfaces by the action of light, and means for developing such surfaces a line at a time.

37. A typographic machine including in combination means for composing successive lines of types, means for impressing same a line at a time upon a light sensitive surface by the action of light, developing means and means for presenting a separate surface to each successive line of types and means for causing each successive impressed surface to be acted upon by said developing means.

38. A typographic machine including in combination means for composing successive lines of types, means for impressing same a line at a time upon a light sensitive surface by the action of light, and means for presenting successive independent and separate surfaces to successive lines of type to be impressed thereby.

39. A typographic machine including in combination means for impressing a line of characters upon a light sensitive surface, a storage device, a developer tank having a plurality of compartments and means for immersing the surface bearing the line of characters successively in a plurality of said compartments and delivering the developed surface to said storage device.

40. A typographic machine including in combination means for impressing a line of characters upon a line bar by light action, means for developing the impressed line bar, and means for receiving and storing the line bar.

41. A typographic machine including in combination means for impressing a line of characters upon successive line bars by light action, means for developing the line bars, and means for receiving and storing the successive developed line bars in the order of their development.

42. A typographic machine including in combination means including an inking device for impressing a line of types upon a sensitive surface by the action of light, a developer tank having a plurality of compartments, and mechanisms for immersing said impressed sensitive surface in one compartment of said tank and withdrawing it and inserting it in another compartment thereof.

43. A typographic machine including in combination means for impressing a line of types upon a sensitive surface by the action of light, a developer tank having a plurality of compartments, and mechanisms for immersing said immersed sensitive surface in one compartment of said tank and withdrawing it and inserting it in another compartment thereof.

44. A typographic machine including in combination a line of types, means for automatically taking an impression from said line of types upon a light sensitive surface by contact with said surface, and automatic means for developing said surface.

45. A typographic machine including in combination a line of types, means for automatically impressing said line of types upon a light sensitive surface by contact with said surface, automatic developing means comprising means for causing said developing means to act on said impressed sensitive surface to develop it.

46. A typographic machine including in combination means for composing successive lines of types, means for impressing same a line at a time upon successive separate light sensitive surfaces by the action of light, and means for developing such separate impressed surfaces a line at a time.

47. A typographic machine including in combination means for composing successive lines of types, means for impressing same a line at a time upon a light sensitive surface by the action of light, and means for automatically presenting successive separate and independent surfaces to each of the successive lines of type to be impressed thereby.

48. A typographic machine including in combination means for automatically impressing a line of characters upon a line bar by light action, automatic means for developing the impressed line bar, and automatic means for receiving and storing the line bar.

In testimony whereof, I have signed my name to this specification, in the presence of two subscribing witnesses.

GEORGE R. CORNWALL.

Witnesses:
  JOHN D. MORGAN,
  CLARA PHILLIPS.